US008813164B2

(12) United States Patent
Blanchard et al.

(10) Patent No.: US 8,813,164 B2
(45) Date of Patent: Aug. 19, 2014

(54) DATA TUNNELING VIA CLOSED CAPTIONING

(75) Inventors: Robert Blanchard, Escondido, CA (US); Mark Kenneth Eyer, Woodinville, WA (US)

(73) Assignee: Sony Corporation, Tokyo (JP)

( * ) Notice: Subject to any disclaimer, the term of this patent is extended or adjusted under 35 U.S.C. 154(b) by 182 days.

(21) Appl. No.: 12/913,193

(22) Filed: Oct. 27, 2010

(65) Prior Publication Data

US 2011/0128443 A1 Jun. 2, 2011

Related U.S. Application Data

(60) Provisional application No. 61/265,295, filed on Nov. 30, 2009.

(51) Int. Cl.
| | |
|---|---|
| H04N 7/16 | (2011.01) |
| H04N 21/434 | (2011.01) |
| H04N 21/435 | (2011.01) |
| H04N 21/235 | (2011.01) |
| H04N 21/488 | (2011.01) |
| H04N 5/44 | (2011.01) |
| H04N 21/236 | (2011.01) |
| H04N 7/088 | (2006.01) |

(52) U.S. Cl.
CPC ......... *H04N 5/4401* (2013.01); *H04N 21/4348* (2013.01); *H04N 21/435* (2013.01); *H04N 21/235* (2013.01); *H04N 21/434* (2013.01); *H04N 21/4884* (2013.01); *H04N 20/31* (2013.01); *H04N 7/0882* (2013.01); *H04N 21/23614* (2013.01)
USPC .......................................... 725/137; 725/112

(58) Field of Classification Search
None
See application file for complete search history.

(56) References Cited

U.S. PATENT DOCUMENTS 5,519,780 A * 5/1996 Woo et al. ..................... 725/137
6,061,719 A * 5/2000 Bendinelli et al. ............ 709/218

(Continued)

FOREIGN PATENT DOCUMENTS

| CN | 1890967 A | 1/2007 |
|---|---|---|
| EP | 0 915 621 A2 | 10/1998 |

(Continued)

OTHER PUBLICATIONS

International Search Report and Written Opinion, PCT/US2010/057244, mailed Jul. 26, 2011, Received Aug. 11, 2011.

(Continued)

*Primary Examiner* — Brian T. Pendleton
*Assistant Examiner* — Olugbenga Idowu
(74) *Attorney, Agent, or Firm* — Miller Patent Services; Jerry A. Miller

(57) ABSTRACT

An example apparatus that processes DTVCC data has a demultiplexer that extracts DTVCC data packets from an DTV signal. A parser receives the DTVCC data packets and parses the data packets by: passing normal DTVCC data to a CC decoder; detecting ancillary data in the DTVCC data packets; and separating the ancillary data from the DTVCC data for output to an ancillary data process. An example apparatus that processes DTVCC data has an ancillary data packager that packages data ancillary to DTV data for insertion into the DTVCC data packets. A DTVCC data packager receives CC data from a CC data source into DTVCC data packets and packages the ancillary data together with the DTVCC data into DTVCC data packets. A multiplexer multiplexes the DTVCC data packets from the DTVCC data packager with non-CCDTV data to produce DTV signal data. This abstract is not to be considered limiting, since other embodiments may deviate from the features described in this abstract.

36 Claims, 5 Drawing Sheets

(56) References Cited

U.S. PATENT DOCUMENTS

| | | | |
|---|---|---|---|
| 6,637,032 B1 * | 10/2003 | Feinleib | 725/110 |
| 6,912,013 B2 | 6/2005 | Katayama et al. | |
| 7,342,613 B2 | 3/2008 | Crinon | |
| 2002/0067428 A1 | 6/2002 | Thomsen | |
| 2004/0237123 A1 | 11/2004 | Park | |
| 2004/0252122 A1 * | 12/2004 | Rothman et al. | 345/467 |
| 2005/0226601 A1 * | 10/2005 | Cohen et al. | 386/75 |
| 2007/0076122 A1 | 4/2007 | Modi et al. | |
| 2007/0250901 A1 * | 10/2007 | McIntire et al. | 725/146 |

FOREIGN PATENT DOCUMENTS

| | | |
|---|---|---|
| EP | 1 727 368 A1 | 5/2006 |
| JP | 2006-211636 | 8/2006 |

OTHER PUBLICATIONS

Japanese Office Action, Corresponding JP Application No. 2012-539085, Aug. 20, 2013.

Extended European Search Report, Corresponding EP Application No. 10833793.2, Received May 16, 2013.

Korean Office Action, Corresponding KR Application No. 10-2012-70122539, Jun. 27, 2013, Received Jul. 10, 2013.

CEA Standard, Digital Television (DTV) Closed Captioning, CEA-708-D, Consumer Electronics Association, Aug. 2008, pp. 21, 63.

Translation of Chinese Office Action for counterpart 201080051804.4, dated Apr. 25, 2014.

Translation of CN1890967 cited above.

* cited by examiner

DATA TUNNELING VIA CLOSED CAPTIONING

CROSS REFERENCE TO RELATED DOCUMENTS

This application is related to and claims priority benefit of U.S. Provisional Patent Application No. 61/265,295 filed Nov. 30, 2009, which is hereby incorporated herein by reference.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

An audio-video (A/V) content provider may wish to embed certain types of data inside content such as television (TV) content. For example, the content provider may wish to provide a URL pointing to the website for a TV series or episode, or a URL corresponding to an advertiser's website or other data that may be useful to the user or be otherwise beneficial. In some instances, such data may be stripped out of a digital television signal when it is processed at a satellite or cable system's headend.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figures 1, 2:
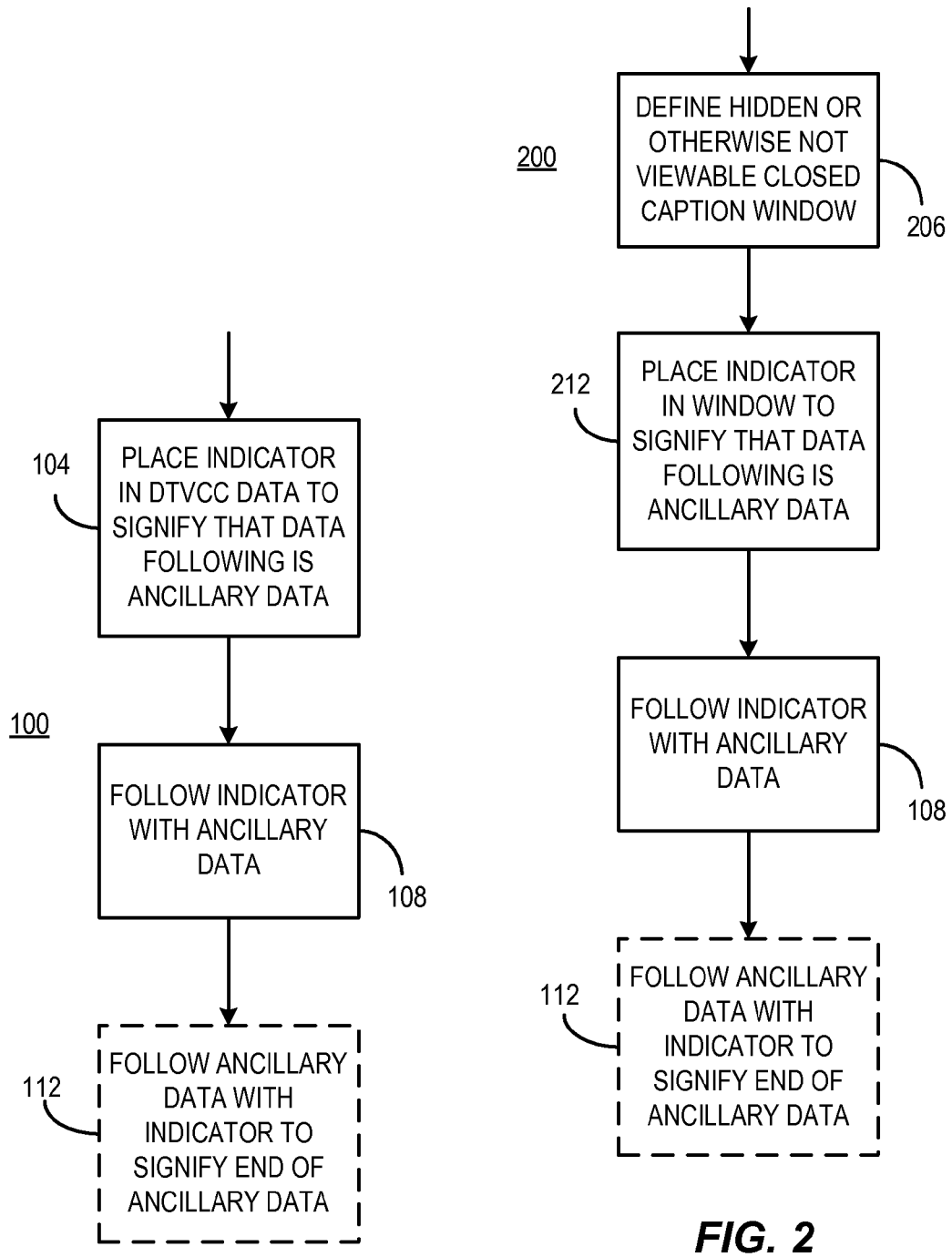
FIG. 1 is an example of a flow diagram illustrating one implementation of a method consistent with certain embodiments of the present invention.
FIG. 2 is an example of a flow chart illustrating another implementation of a method consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms used herein are intended to be consistent with CEA-708 DTV closed captioning specifications and should be interpreted accordingly.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "program" or "computer program" or similar terms, as used herein, is defined as a sequence of instructions designed for execution on a computer system. A "program," or "computer program," may include a subroutine, a function, a procedure, an object method, an object implementation, in an executable application, an applet, a servlet, a source code, an object code, a shared library/dynamic load library and/or other sequence of instructions designed for execution on a computer system.

The term "program," as used herein, may also be used in a second context (the above definition being for the first context). In the second context, the term is used in the sense of a "television program." In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment," "certain embodiments," an "embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive.

The term "ancillary data" as used herein is intended to mean any data that accompanies the video data content that is placed in the closed caption data area in any of the manners prescribed herein, but does not appear to the viewer of the video content as closed captioning (CC) data. Such ancillary data is considered ancillary since it forms a part of the overall video content package, but can be any data at all without limitation.

As previously noted, a content provider may wish to embed certain types of data inside the content, such as a URL pointing to the website for the series or episode, URLs corresponding to advertiser's websites, triggering metadata used in conjunction with triggered downloadable objects, content identification (ISAN, for example) numbers, or actual content (graphics, text, XML instance documents, etc.). Another purpose is a content identification tag that could be used as a forensic fingerprint. With many methods of inclusion of such data, the data does not survive processing at cable headends and other service providers, which can process the data by re-multiplexing, re-quantizing video, stripping of ancillary data streams, etc. Additionally, other ancillary data may be embedded within the closed captioning data in a manner consistent with the present teachings in order to accomplish any function desired, and is not limited to URLs and the other examples described above. For example, a command disabling a receiver (e.g., a set top box which is being used in an unauthorized manner), or other commands that utilize specialized functionality in a receiver device could be embedded in the closed captioning data in accord with embodiments consistent with the present invention.

The present subject matter involves either extending the CEA-708 advanced closed captioning protocol to include data packets that are disregarded by legacy receivers, or utilizing methods in which processing of data does not result in the display of characters but can be otherwise retrieved and used. Since closed captioning according to the CEA-708 specification can provide 9600 bps of data bandwidth, the capacity of the closed caption channel can accommodate multiple languages with bandwidth to spare for use in a manner consistent with implementations of the present subject matter.

Once one realizes that the closed caption data can be used to avoid the problems noted above, certain techniques can potentially be used for placing ancillary data inside the closed captioning data for digital TV.

Data can be written into an always hidden caption window. Within each caption window, ancillary data blocks may be preceded with a predefined code to identify them as such.

The techniques described hereinafter can be used with a variety of video services, such as terrestrial fixed and mobile TV, cable, satellite, and IPTV. The data could be retrieved by a variety of CE devices and set-top boxes. The present subject matter, therefore, involves defining a transport method for metadata, triggers, or ancillary content that rides alongside an audio/video program in such a way that it is more likely to survive processing at cable, satellite, IPTV, and other headends. Specifically, the subject matter involves the use of the CEA-708 caption data that is transported within cc_data( ) packets in video user_data, in an MPEG-2 video stream, per specifications A/53 and CEA-708, or in an H.264 video stream per specifications A/72, SCTE 128, and CEA-708.

Of the above possibilities, it is most desirable for all legacy receivers that receive the ancillary data to ignore it or otherwise not have its normal operation disrupted by the ancillary data. In accord with the hidden window technique, the ancillary data is placed in a window which is specified to be kept in the "invisible" state (hidden). This can be accomplished in several ways.

In one example, the window is hidden by initially defining the window as being an invisible window. This capability is provided for in the CEA-708 specification in anticipation that such an invisible window will later be rendered visible. This feature is accomplished by setting the "visible" attribute to "false" (0) in the Define Window command. This window can later be defined as "true" (1) so that it becomes visible. However, if never rendered visible, the text associated with the window will never be displayed on the television display.

Another implementation involves defining the window to have transparent text overlaying a transparent background. Thus, although the window is present, since both text and background are transparent the viewer does not see the window.

Once one defines a window which will not be displayed and thereby disrupt the viewer's display, one must account for the fact that windows using this attribute may have other uses and be filled with data other than the ancillary data. Hence, an indicator is used at the beginning of the ancillary data block to signify that the information that follows is intended to be parsed out as ancillary data. This indicator can take many forms, but generally may be any character or sequence of characters that are highly unlikely to be present in a closed caption stream or that will never appear in a closed caption stream that is to be displayed. One example is an undefined P16 Unicode character or one or more other undefined or un-displayable characters. Other examples include the use of unlikely sequences of defined characters, such as "§©."

Turning now to FIG. 1, an example process 100 wherein at 104 ancillary data indicator is placed in the digital television closed captioning (DTVCC) data stream (meaning any portion of the data defined as closed captioning data according to CEA-708). The ancillary data indicator is inserted using a specified method that signifies to a receiver designed to understand the indicator the existence of ancillary data that follows the indicator at 108. In preferred implementations, the ancillary data indicator (a data element) and the ancillary data appear in the cc_data( ) packet as defined by the DTV Closed Captioning CEA-708 specification. Once the ancillary data is inserted, in some implementations it may be desirable to follow the ancillary data at 112 by another indicator so that a pair of indicators surround the ancillary data. The use of the term indicator herein can be interpreted to be either a single indicator or an indicator that has a start and an end component as depicted in process 100. It should be noted that the indicator of 108 and the indicator of 112 may be the same indicator or different indicators.

With reference to FIG. 2, another example process 200 is depicted. This process is similar to that of process 100 and can be considered a subset thereof. This process 200 defines a hidden, invisible or otherwise not viewable closed captioning window at 206. This can be done by defining a CEA-708 closed captioning window as having a visible attribute of "NO" or by defining transparent text on a transparent background as described above, or using any other feature of closed captioning that results in the window being hidden. This permits the content developer to place any data in the hidden window without any danger of the window and the ancillary data and indicator data element(s) being visible on-screen thereby avoiding disruption of the normal closed captioning operation. In this implementation, an indicator data element is then placed in the window at 212. This indicator data element can be any character or sequence of characters that would not normally appear in the closed captioning data in a closed captioning window. An example might be one or more undefined or un-displayable characters, or an otherwise undefined P16 unicode character or characters, or any other unlikely set of characters (much like an unlikely combination of keystrokes is used to reset a computer, or an unlikely sequence of characters can designate a web site name follows).

The indicator data element is followed at 108 by the ancillary data, which as disclosed above could be a URL or a XML scripts or hardware specific commands. As with process 100, process 200 may use a second indicator data element to signify the end of the ancillary data. Here, the term "data element" or "indicator data element" can be used to mean a single data element or a pair of data elements that wrap around the ancillary data (which may represent computer-implemented functional modules in any functional arrangement).

The techniques described above can be especially useful when the embedded ancillary data is XML-formatted data. In such cases, the embedded ancillary data can be used in a variety of ways including providing a compatible receiver device to execute any function that can be implemented using the XML. In addition, the ancillary caption data can be used as a fingerprint to forensically identify receivers that carry out certain actions.

Figure 3:
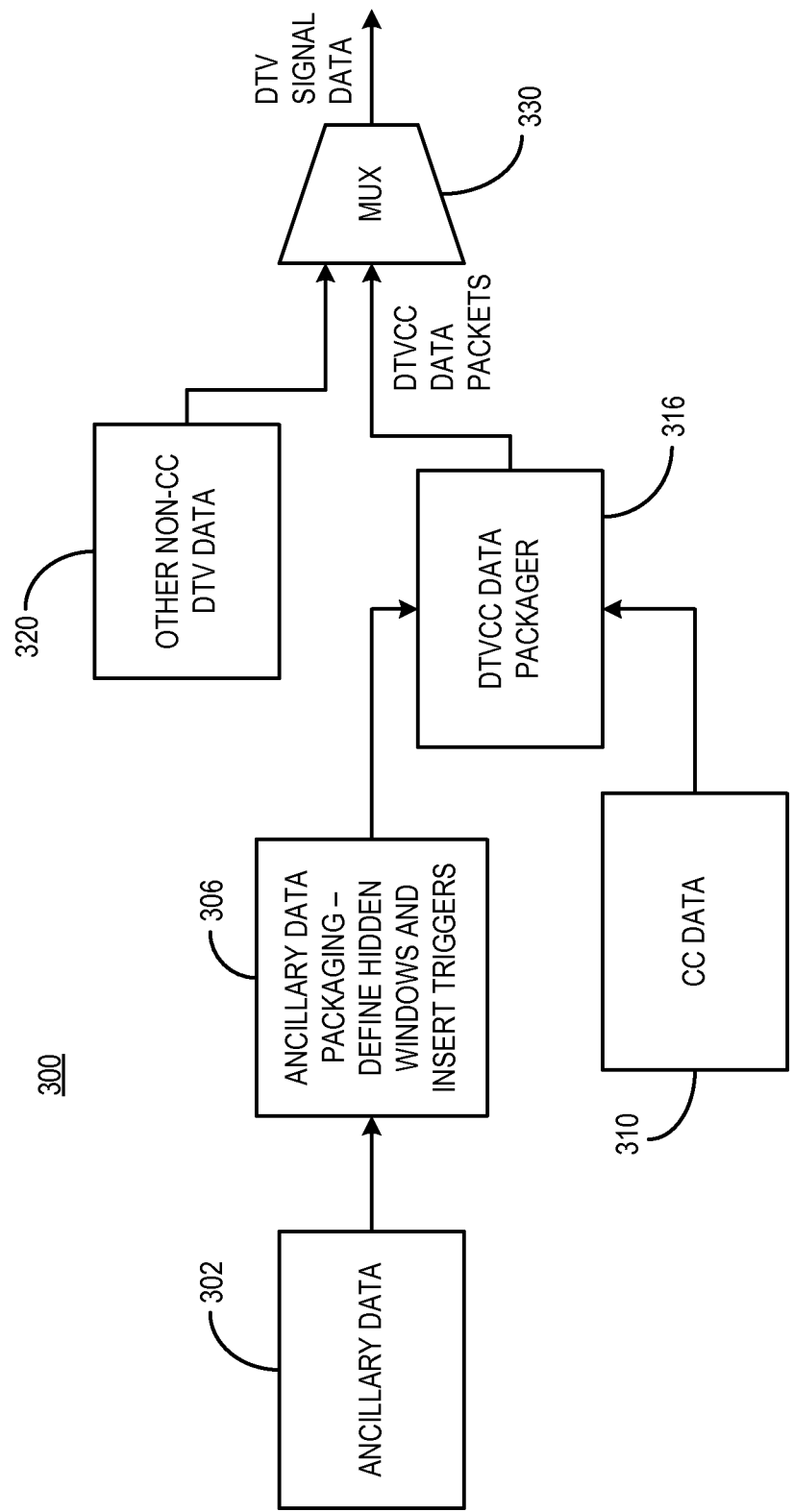
FIG. 3 is an example of a functional block diagram of a system for generating closed captioning data containing ancillary data as part of at digital television data stream in a manner consistent with certain embodiments of the present invention.

Referring now to FIG. 3, a functional block diagram 300 is depicted for a system (which may represent computer implemented functional modules in any functional arrangement). In this process, a set of ancillary data 302 is created by a content creator or programmer. This ancillary data is packaged at 306 using indicator data elements and possibly hidden windows as described in connection with process 100 and 200. This ancillary data and associated data elements and possibly hidden window definitions are provided along with normal closed captioning data 310 to a DTVCC data packager which suitably combines all of the normal CC data and ancillary CC data into CEA-708 compliant DTVCC data packets. These DTVCC data packets are then combined with other non-CC DTV data at a multiplexer 330 to produce an output DTV multiplex or packet stream. This multiplex can then be modulated to RF and produced as an output DTV signal can then be transmitted or broadcast to end-users as well as through service providers such as cable television system operators and satellite television operators.

Thus, as described above, an apparatus that processes DTV closed caption data has an ancillary data packager 306 that packages data ancillary to DTV data for insertion into the DTVCC data packets. A DTVCC data packager 316 receives closed caption data from a source of closed captioning information into DTVCC data packets and that packages the ancillary data together with the DTVCC data into DTVCC data packets. A multiplexer 330 multiplexes the DTVCC data packets from the DTVCC data packager with non-closed captioning DIV data 320 to produce DTV signal data In certain implementations, the ancillary data is packaged at the ancillary data packager with a data element that identifies the ancillary data as ancillary data to a receiver. The data element can be a character or sequence of characters that are not found in normal closed caption text or an otherwise undefined P16 unicode character or a pair of data elements that define the start and end of the ancillary data or the presence of an otherwise undefined extended_service_number for the closed caption data or defining closed caption data to be invalid. The ancillary data can be XML code. The ancillary data packager may package the ancillary data in a hidden window.

As described above, a method of packaging ancillary data for digital television (DTV) content provider so that when passed through a video content distributor the ancillary data is not removed or changed by the video content distributor, the method carried out by the DTV content provider involves providing a digital representation of the video content; generating closed caption data to form a part of the video content; where the closed caption data is made up of at least: a window definition that defines a hidden window; a data element that signifies the presence of ancillary data in the hidden window, and the ancillary data defined to be within the hidden window. Neither the data element nor the ancillary data are displayed as closed caption data.

In certain implementations, the data element is a character or sequence of characters that are not found in normal closed caption text such as an otherwise undefined P16 unicode character. In certain implementations, the data element is actually a pair of data elements that define the start and end of the ancillary data. The ancillary data can be XML code. A hidden window can be defined to have transparent text over a transparent background or by having a window defined as a window with a visible attribute set as false or otherwise defined as hidden. Any of these methods can be stored on a computer readable medium such as a non-transitory computer readable storage medium storing instructions which, when executed on one or more programmed processors, carry out the method.

In another example, a method of packaging ancillary data for digital television (DTV) content provider so that when passed through a video content distributor the ancillary data is not removed or changed by the video content distributor, the method carried out by the DTV content provider involves providing a digital representation of the video content; generating closed caption data to form a part of the video content; where the closed caption data at least has a data element that signifies the presence of ancillary data, and the ancillary data. Neither the data element nor the ancillary data are displayed closed caption data.

In certain implementations, the data element is an otherwise undefined extended_service_number for the closed caption data or a defining of the closed caption data to be invalid.

Any of these methods can be stored on a computer readable medium such as a non-transitory computer readable storage medium storing instructions which, when executed on one or more programmed processors, carry out the method.

Figure 4:
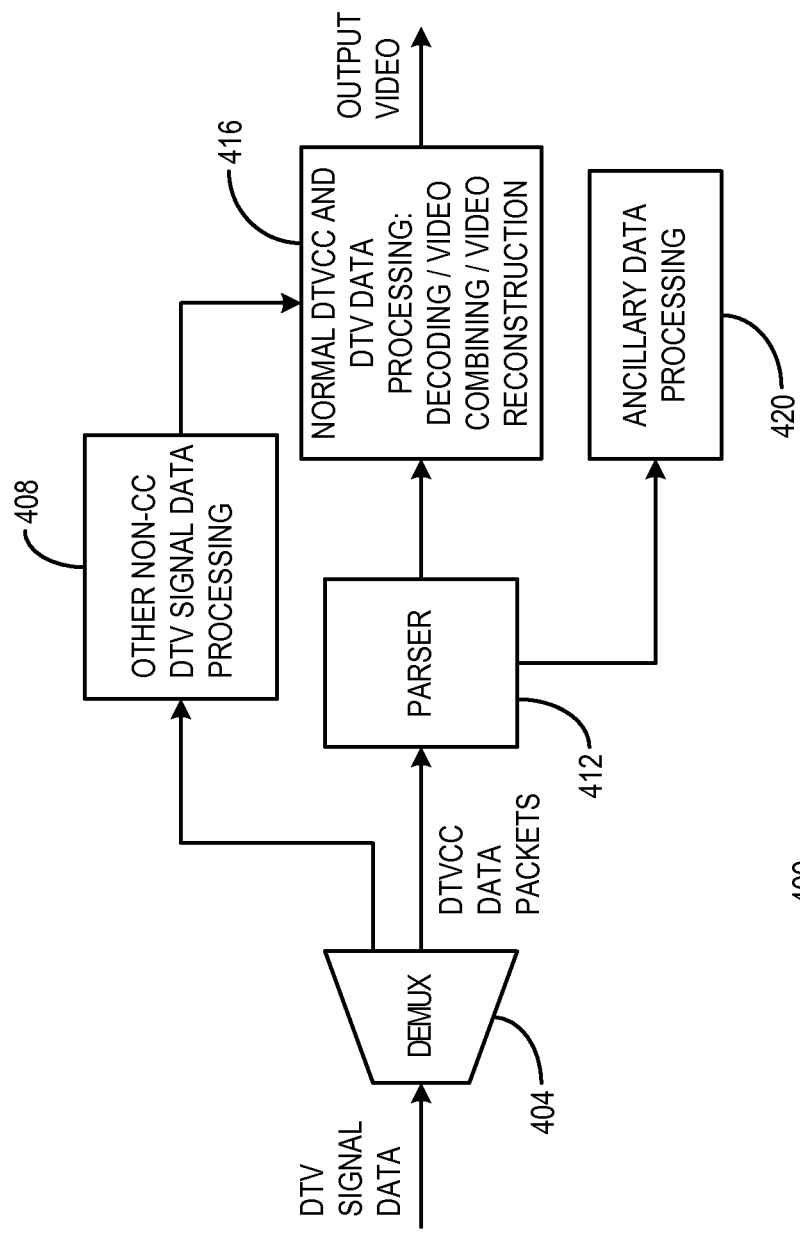
FIG. 4 is an example of a functional block diagram of a system for receiving closed captioning data containing ancillary data as part of at digital television data stream in a manner consistent with certain embodiments of the present invention.

Once the DTV signal is transmitted, it is ultimately received by a DTV receiver device (which may represent computer implemented functional modules in any functional arrangement) depicted in part as device 400 of FIG. 4. When the DTV signal data are received the data is demultiplexed at demultiplexer 404 which parses the DTV signal data into DTVCC data packets and other DTV data. For purposes of this description, the non-CC data is lumped together (since it is not relevant to the present subject matter) and is processed at 408 according to its normal DTV function. The DTVCC data packets are then further parsed at parser 412 which separates normal DTVCC data which is decoded, combined with video and video reconstructed at 416 in a normal manner. The ancillary data are passed to 420 where it is processed in any suitable manner. For example, if the ancillary data is a script, the script is executed at 420. If the ancillary data is a URL, the processing may involve finding the URL on the Internet in order to take a predefined action. In other words, the ancillary data can serve any purpose desired by the programmer and system designers.

Thus, as described above, an apparatus that processes DTV closed caption data has a demultiplexer that extracts DTVCC data packets from an DTV signal. A parser receives the DTVCC data packets and parses the data packets by: passing normal DTVCC data to a closed caption decoder; detecting ancillary data in the DTVCC data packets; and separating the ancillary data from the DTVCC data for output to an ancillary data process.

In certain implementations, the ancillary data is detected by the presence of a data element. The data element can be a character or sequence of characters that are not found in normal closed caption text or can be an otherwise undefined P16 unicode character or can be a pair of data elements that define the start and end of the ancillary data or can be the presence of an otherwise undefined extended_service_number for the closed caption data or can be defining closed caption data to be invalid. The ancillary data can be XML code. The ancillary data can reside in a hidden window.

An example method of processing ancillary data from a digital television (DTV) content provider involves receiving a digital representation of the video content; receiving closed caption data that form a part of the video content;

where the closed caption data at least has: a window definition that defines a hidden window; a data element that establishes the presence of ancillary data in the hidden window, and the ancillary data defined to be within the hidden window. Neither the data element nor the ancillary data are displayed as closed caption data. The method further involves parsing the ancillary data out of the closed caption data for processing as non-closed caption data.

In certain implementations, the data element is a character or sequence of characters that are not found in normal closed caption text or an otherwise undefined P16 unicode character. The data element can actually be a pair of data elements that define the start and end of the ancillary data. The ancillary data can be XML code. The hidden window can be defined to have transparent text over a transparent background or can be defined as a window with a visible attribute set as false or otherwise defined as hidden.

Another method of processing ancillary data from a digital television (DTV) content provider involves receiving a digital representation of the video content; receiving closed caption data that form a part of the video content; where the closed caption data at least has: a data element that signifies the presence of ancillary data, and the ancillary data. Neither the data element nor the ancillary data are displayed as closed caption data. The method further involves parsing the ancillary data out of the closed caption data for processing as non-closed caption data.

In certain implementations the data element is the presence of an otherwise undefined extended_service_number for the closed caption data or defining closed caption data to be invalid.

Any of these methods can be stored on a computer readable medium such as a non-transitory computer readable storage medium storing instructions which, when executed on one or more programmed processors, carry out the method.

Figure 5:
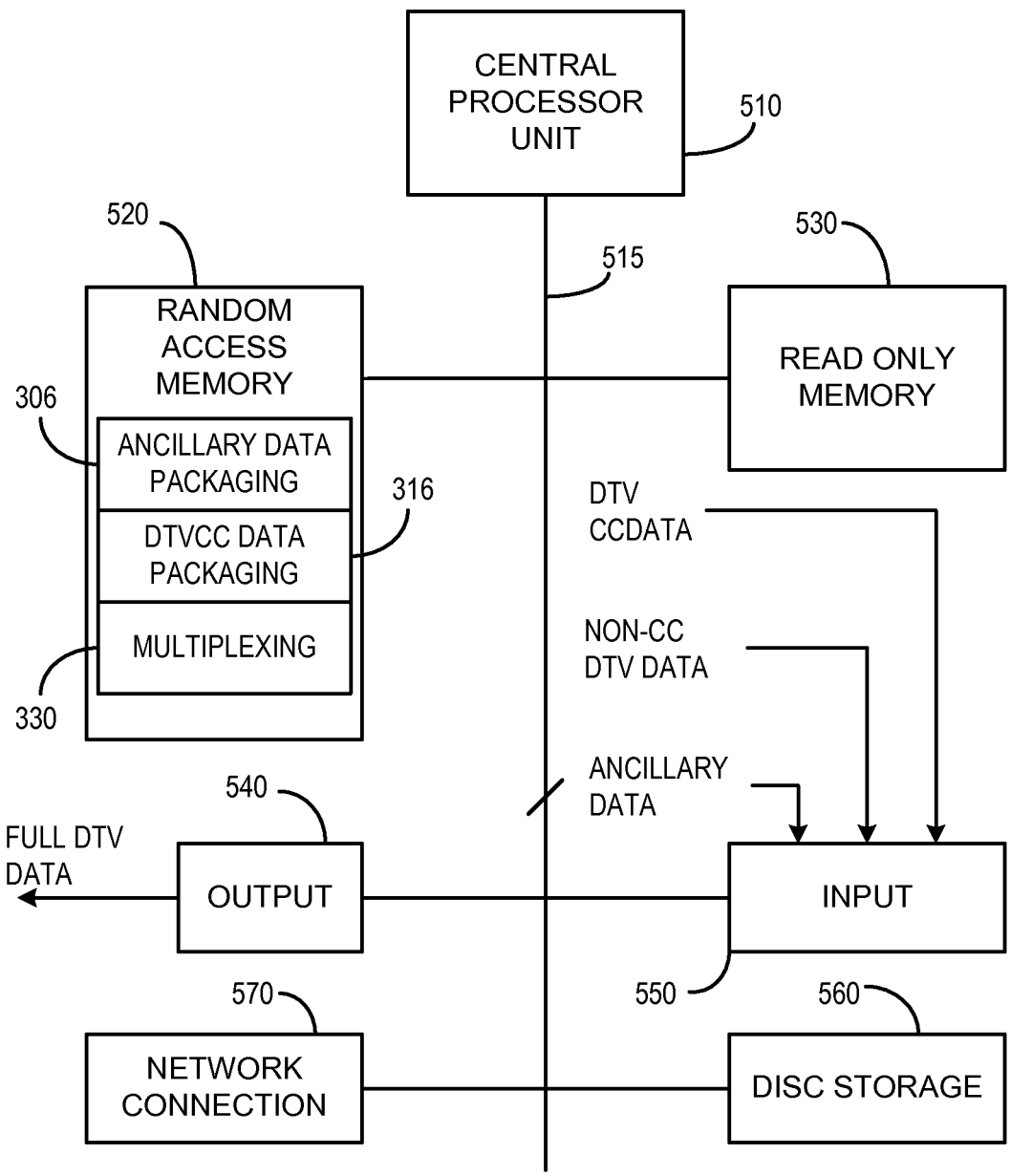
FIG. 5 is a block diagram of an example implementation of a system for generating closed captioning data in a manner consistent with certain embodiments of the present invention.

The functions previously described in connection with system 300 can be carried out on a programmed general purpose computer system used in producing the content including closed captioning data as depicted in FIG. 5. Computer system 500 has a central processor unit (CPU) 510 with an associated bus 515 used to connect the central processor unit 510 to Random Access Memory 520 and/or Non-Volatile Memory (such as Read-Only Memory) 530 in a known manner. An output mechanism at 540 may be provided in order to display and/or print and/or store (e.g., removable storage) output for the computer user. Similarly, input devices 550 such as keyboard and mouse as well as interfaces or disc drives etc. serving as sources for the ancillary data, the CC data and the non-CC DTV data may be provided for the input of information by the computer user. Computer 500 also may have disc storage 560 for storing large amounts of information including, but not limited to, program files and data files. Computer system 500 may be is coupled to a local area network (LAN) and/or wide area network (WAN) and/or the Internet using a network connection 570 such as an Ethernet adapter coupling computer system 500, possibly through a fire wall.

The packaging of the ancillary data with CC data and non-CC data is carried out using processes such as those depicted in system 300 as functional modules shown stored in RAM memory 520. Those skilled in the art will appreciate that other module arrangements for the program functions can be implemented without departing from embodiments consistent with the present teachings. Moreover, the input and output can be in the form of stored content or content received or transmitted over the network interface without limitation.

Figure 6:
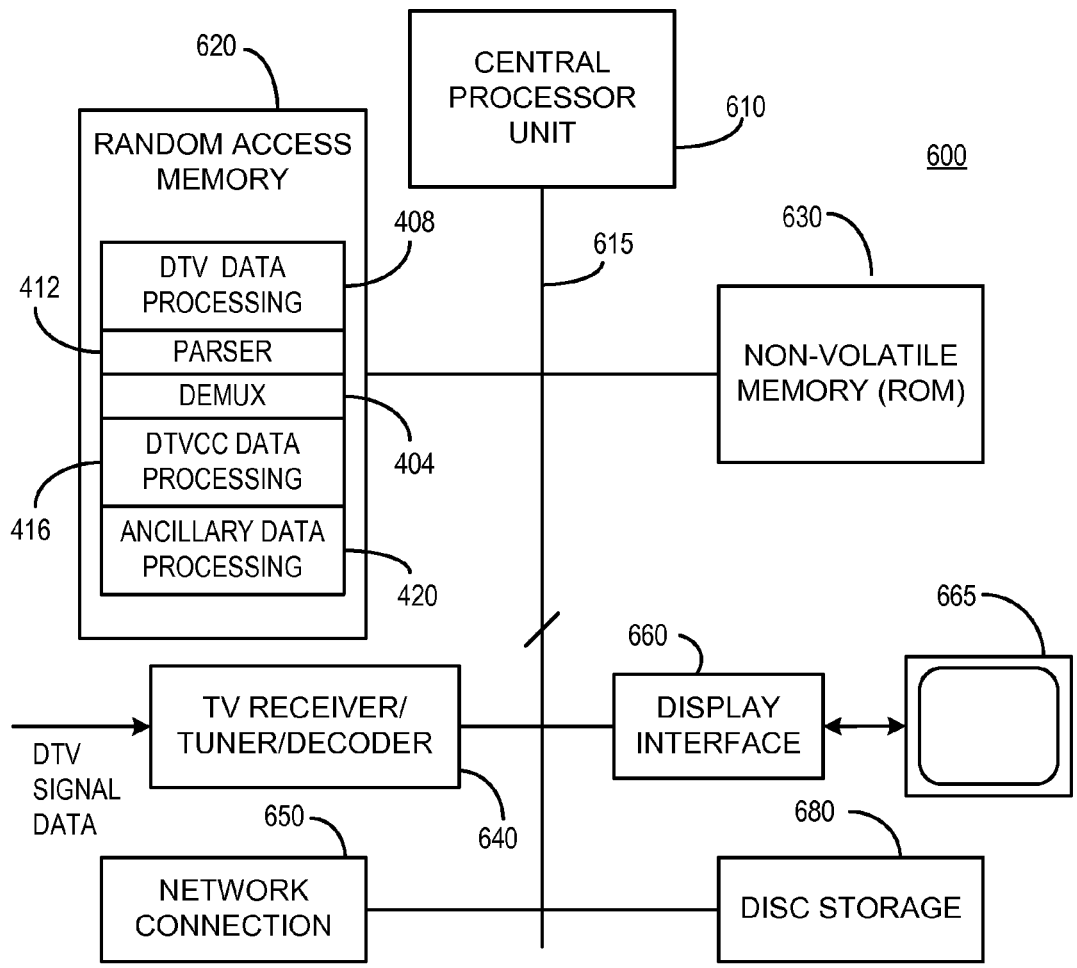
FIG. 6 is a block diagram of an example implementation of a TV system that receives the closed captioning data in a manner consistent with certain embodiments of the present invention.

Some of the functions previously described in connection with system 400 can also be carried out with the assistance of a programmed general purpose processor forming a part of a television receiver device, such as the exemplary system 600 depicted in FIG. 6. System 600 has a central processor unit (CPU) 610 with an associated bus 615 used to connect the central processor unit 610 to Random Access Memory 620 and/or Non-Volatile Memory 630 in a known manner. The incoming DTV data can be received via a television receiver/decoder 640 or in the case of Internet TV (IPTV) may be provided via a network interface 650. In order to display the video output, a display interface 660 is provided which may be coupled internally or externally to a display 665. System 600 also may have disc storage 680 for storing large amounts of information including, but not limited to, program files and data files and to provide digital video recording functions.

In system 600, the digital television closed captioning function and extraction of ancillary data is carried out in the manner described in connection with system 400 with the functions shown in system 400 being shown as functional program modules in RAM as depicted in system 600. Those skilled in the art will appreciate that the arrangement of functional blocks can be changed without departing from embodiments consistent with the present teachings.

Those skilled in the art will recognize, upon consideration of the above teachings, that certain of the above exemplary embodiments are based upon use of a programmed processor. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Certain embodiments described herein, are or may be implemented using one or more programmed processors executing programming instructions that are broadly described above in flow chart form that can be stored on any suitable electronic or computer readable storage medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method of packaging ancillary data for a digital television (DTV) content provider, the method carried out by the DTV content provider, comprising:
providing a digital representation of the video content;
packaging closed caption data to form a part of the video content; and
where the closed caption data comprises:
a window definition that defines a hidden window, where the window definition comprises a CEA-708 compliant definewindow command having command parameters that define a window in a manner that prevents the window from being visible;
a data element comprising an otherwise undefined P16 Unicode character that signifies the presence of ancillary data in the hidden window, and
the ancillary data defined to be within the hidden window; and
whereby, neither the data element nor the ancillary data are displayed as closed caption data.

2. The method according to claim 1, where the data element comprises a character or sequence of characters that are not found in normal closed caption text.

3. The method according to claim 1, where the data element comprises a pair of data elements that define the start and end of the ancillary data.

4. The method according to claim 1, where the ancillary data comprises XML code.

5. The method according to claim 1, where the hidden window is defined to have transparent text over a transparent background.

6. The method according to claim 1, where the hidden window is defined as a window with a visible attribute set as false.

7. The method according to claim 1, where the hidden window is a window that is defined as hidden.

8. A non-transitory computer readable storage medium storing instructions which, when executed on one or more programmed processors, carry out a method according to claim 1.

9. A method of packaging ancillary data for digital television (DTV) content provider, the method carried out by the DTV content provider, comprising:
providing a digital representation of the video content;
packaging closed caption data to form a part of the video content; and
where the closed caption data comprises:
a data element that signifies the presence of ancillary data, where the data element comprises the presence of an otherwise undefined P16 Unicode character, and
the ancillary data; and
where neither the data element nor the ancillary data are displayed as closed caption data.

10. A non-transitory computer readable storage medium storing instructions which, when executed on one or more programmed processors, carry out a method comprising:
providing a digital representation of the video content;
packaging closed caption data to form a part of the video content; and
where the closed caption data comprises:
a data element that signifies the presence of ancillary data, where the data element comprises the presence of an otherwise undefined P16 Unicode character, and
the ancillary data; and
where neither the data element nor the ancillary data are displayed as closed caption data.

11. A method of processing ancillary data from a digital television (DTV) content provider, comprising:
receiving a digital representation of the video content;
receiving closed caption data that form a part of the video content;
where the closed caption data comprises:
a window definition that defines a hidden window, where the window definition comprises a CEA-708 compliant definewindow command having command parameters that define a window in a manner that prevents the window from being visible;
a data element that signifies the presence of ancillary data, where the data element comprises the presence of an otherwise undefined P16 Unicode character; and
the ancillary data defined to be within the hidden window;
whereby, neither the data element nor the ancillary data are displayed as closed caption data; and
parsing the ancillary data out of the closed caption data for processing as non-closed caption data.

12. The method according to claim 11, where the data element comprises a character or sequence of characters that are not found in normal closed caption text.

13. The method according to claim 11, where the data element comprises a pair of data elements that define the start and end of the ancillary data.

14. The method according to claim 11, where the ancillary data comprises XML code.

15. The method according to claim 11, where the hidden window is defined to have transparent text over a transparent background.

16. The method according to claim 11, where the hidden window is defined as a window with a visible attribute set as false.

17. The method according to claim 11, where the hidden window is a window that is defined as hidden.

18. A non-transitory computer readable storage medium storing instructions which, when executed on one or more programmed processors, carry out a method comprising:
receiving a digital representation of the video content;
receiving closed caption data that form a part of the video content;
where the closed caption data comprises:
a window definition that defines a hidden window, where the window definition comprises a CEA-708 compliant definewindow command having command parameters that define a window in a manner that prevents the window from being visible;
a data element that signifies the presence of ancillary data, where the data element comprises the presence of an otherwise undefined P16 Unicode character; and
the ancillary data defined to be within the hidden window;
whereby, neither the data element nor the ancillary data are displayed as closed caption data; and
parsing the ancillary data out of the closed caption data for processing as non-closed caption data.

19. A method of processing ancillary data from a digital television (DTV) content provider, comprising:
receiving a digital representation of the video content;
receiving closed caption data that form a part of the video content;
where the closed caption data comprises:
a data element that signifies the presence of ancillary data, where the data element comprises the presence of an otherwise undefined P16 Unicode character; and the ancillary data;
whereby neither the data element nor the ancillary data are displayed as closed caption data; and
parsing the ancillary data out of the closed caption data for processing as non-closed caption data.

20. A non-transitory computer readable storage medium storing instructions which, when executed on one or more programmed processors, carry out a method comprising:
receiving a digital representation of the video content;
receiving closed caption data that form a part of the video content;
where the closed caption data comprises:
a data element that signifies the presence of ancillary data, where the data element comprises the presence of an otherwise undefined P16 Unicode character; and
the ancillary data;
whereby neither the data element nor the ancillary data are displayed as closed caption data; and
parsing the ancillary data out of the closed caption data for processing as non-closed caption data.

21. An apparatus that processes DTV closed caption data, comprising:
a demultiplexer that extracts DTVCC data packets from an DTV signal;
a parser that receives the DTVCC data packets and parses the data packets by:
passing normal DTVCC data to a closed caption decoder;
detecting ancillary data in the DTVCC data packets, where the ancillary data is detected by the presence of a data element signifying the presence of ancillary data, and where the data element comprises an otherwise undefined P16 unicode character; and
separating the ancillary data from the DTVCC data for output to an ancillary data process.

22. An apparatus that processes DTV closed caption data, comprising:
a demultiplexer that extracts DTVCC data packets from an DTV signal;
a parser that receives the DTVCC data packets and parses the data packets by:
passing normal DTVCC data to a closed caption decoder;
detecting ancillary data in the DTVCC data packets, where the ancillary data is detected by the presence of a data element signifying the presence of ancillary data;
where the data element comprises the presence of an otherwise undefined P16 Unicode character; and
separating the ancillary data from the DTVCC data for output to an ancillary data process.

23. The apparatus according to claim 22, where the data element further comprises a pair of data elements that define the start and end of the ancillary data.

24. An apparatus that processes DTV closed caption data, comprising:
a demultiplexer that extracts DTVCC data packets from an DTV signal;
a parser that receives the DTVCC data packets and parses the data packets by:
passing normal DTVCC data to a closed caption decoder;
detecting ancillary data in the DTVCC data packets, where the ancillary data is detected by the presence of a data element signifying the presence of ancillary data; and
separating the ancillary data from the DTVCC data for output to an ancillary data process;
where the data element comprises the presence of an otherwise undefined P16 Unicode character.

25. An apparatus that processes DTV closed caption data, comprising:
a demultiplexer that extracts DTVCC data packets from an DTV signal;
a parser that receives the DTVCC data packets and parses the data packets by:
passing normal DTVCC data to a closed caption decoder;
detecting ancillary data in the DTVCC data packets, where the ancillary data is detected by the presence of a data element signifying the presence of ancillary data; and
separating the ancillary data from the DTVCC data for output to an ancillary data process;
where the data element comprises the presence of an otherwise undefined P16 Unicode character.

26. The apparatus according to claim 21, where the ancillary data comprises XML code.

27. The apparatus according to claim 21, where the ancillary data resides in a hidden window.

28. The apparatus according to claim 25, where the data element further comprises a pair of data elements that define the start and end of the ancillary data.

29. The apparatus according to claim 25, where the ancillary data comprises XML code.

30. The apparatus according to claim 25, where the ancillary data packager packages the ancillary data in a hidden window.

31. The apparatus according to claim 22, where the ancillary data comprises XML code.

32. The apparatus according to claim 22, where the ancillary data resides in a hidden window.

33. The apparatus according to claim 32, where the ancillary data comprises XML code.

34. The apparatus according to claim 25, where the ancillary data resides in a hidden window.

35. The apparatus according to claim 24, where the ancillary data comprises XML code.

36. The apparatus according to claim 24, where the ancillary data resides in a hidden window.

* * * * *